Patented Apr. 20, 1926.

1,581,111

UNITED STATES PATENT OFFICE.

ROBERT J. GOODRICH, OF SOUTH MILWAUKEE, WISCONSIN, ASSIGNOR TO THE NEWPORT COMPANY, OF MILWAUKEE, WISCONSIN, A CORPORATION OF DELAWARE.

ANTHRACENE DYE AND PROCESS OF MAKING.

No Drawing.    Application filed April 4, 1925.    Serial No. 20,596.

*To all whom it may concern:*

Be it known that I, ROBERT J. GOODRICH, a citizen of the United States, and a resident of the city of South Milwaukee, in the county of Milwaukee and State of Wisconsin, have invented certain new and useful Improvements in an Anthracene Dye and Process of Making; and I do hereby declare that the following is a full, clear, and exact description of the same.

This invention relates to coloring matters of the anthracene series and a process of making the same, more particularly to the coloring matters obtained by the halogenization of the condensation product of a 2.2'-dimethyl-1.1'-dianthraquinonyl body.

A coloring matter has been produced, heretofore, from the condensation product of 2.2' dimethyl-1.1.'-dianthraquinonyl by halogenizing the same in nitrobenzol. The reaction product, which is sparingly soluble in nitrobenzol, is recovered by filtration as a cake containing nitrobenzol. This cake is then washed with alcohol to remove all traces of nitrobenzol, and the purified cake is dissolved in strong sulphuric acid and drowned in water to obtain the coloring matter in the finely precipitated form desired for vat dyeing. The filtered coloring matter, washed free of acid, is then in paste form ready for use. For this process to be economical the nitrobenzol must be recovered.

The present invention has for an object the production of coloring matter by the halogenization of the condensation product of 2.2'-dimethyl-1.1'-dianthraquinonyl in fuming sulphuric acid, from which the resulting coloring matter may be precipitated in a form suitable for immediate use in vat dyeing.

This process eliminates the use of organic solvents and the necessity for their subsequent recovery. Furthermore, as the reaction product is completely soluble in the fuming sulphuric acid used, the reaction proceeds with greater facility and greater economy than when nitrobenzol is used. And in addition, the reaction product is by the one operation of drowning, obtained in the condition desirable for use in vat dyeing, whereas when nitrobenzol is used, the product must first be filtered and washed free of nitrobenzol, and then it is desirable that it be redissolved in sulphuric acid and drowned in water to put the product in a finely divided form. Accordingly, my process results in the elimination of the use of organic solvents and of their recovery, in a greater facility of reaction and economy, and in the elimination of several steps.

A further object of this invention is the production of a purer coloring matter of a more brilliant shade.

Other and further important objects of this invention will be apparent from the disclosures in the following description, which sets forth the preferred form of my invention.

The condensation product of 2.2'-dimethyl-1.1'-dianthraquinonyl is well known, so that the process for making the same need not be here discussed. I dissolve this condensation product in sulphuric acid containing free sulphur trioxide, commonly known as anhydride. I then introduce the particular halogen to be used in the amount necessary to give the desired degree of helagenization, and continue the reaction with agitation at about 30–50° C. until complete reaction is obtained. I have found that the reaction goes better and more rapidly in the presence of a catalyzer, such as iodine, or any other halogen carrier. By using sulphuric acid containing free sulphur trioxide, the latter probably acts to combine with the halogen acid liberated in the reaction to form a halogen sulphonic acid, and this removal of one of the reaction products, viz., the halogen acid, assists in carrying on the reaction.

The following example will serve to illustrate my process in a preferred form:

Example: Dissolve 1 part by weight of the product obtained by the condensation of 2.2'-dimethyl 1.1'-dianthraquinonyl in 20 parts by weight of fuming sulphuric acid containing 10% of free anhydride, add $\frac{1}{10}$ part by weight of iodine as catalyst and 1 part by weight of bromine. Agitate well at 40° C. for 20 hours. Pour the reaction mass into 100 parts by weight of cold water, filter and wash free of acid with water. The product is thus obtained in a very fine suspension and may be used in this paste form for dyeing in a hydrosulphite vat.

The coloring matter obtained by the above illustrated method is in dry form a reddish brown powder; in alkaline hydrosulphite it yields a cherry red vat which produces on cotton blue-red shades, changing into brilliant orange-red shades on washing and oxidation. Its chemical formula is probably represented by the following

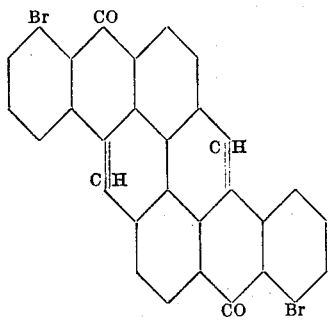

It will be understood that the shade of the dyeing will vary somewhat according to the degree of bromination of the product. A di-brom derivative will be the ultimate result if sufficient bromine were used, but it is apparent that with less than a sufficient amount of bromine, derivatives of various degrees of bromination will be formed. The more bromine is used, in general the redder the shade will be. If chlorine is used in place of bromine, still a different shade will be obtained.

I am aware that numerous details of the process may be varied through a wide range without departing from the spirit of this invention, and I do not desire limiting the patent granted other than as necessitated by the prior art.

I claim as my invention:

1. The process of making a coloring matter, which consists in treating the condensation product of 2.2' dimethyl 1.1' dianthraquinonyl in fuming sulphuric acid with bromine in the presence of a catalyst.

2. The process of making a coloring matter, which consists in treating the condensation product of 2.2' dimethyl 1.1' dianthraquinonyl in fuming sulphuric acid with bromine.

3. The process of making a coloring matter, which consists in treating the condensation product of 2.2' dimethyl 1.1' dianthraquinonyl in a solvent containing free sulphuric anhydride with a halogen.

4. The process of producing a coloring matter of the anthracene series, which consists in treating the condensation product of a 2.2' dimethyl-1.1'-dianthraquinonyl body in a solvent containing free sulphuric acid anhydride with a halogen.

In testimony whereof I have hereunto subscribed my name.

ROBERT J. GOODRICH.